(12) United States Patent
Ohashi et al.

(10) Patent No.: US 10,263,429 B2
(45) Date of Patent: Apr. 16, 2019

(54) BIDIRECTIONAL DC-DC CONVERTER, POWER CONDITIONER, AND DISTRIBUTED POWER SYSTEM

(71) Applicant: OMRON Corporation, Kyoto-shi, Kyoto (JP)

(72) Inventors: Makoto Ohashi, Uji (JP); Takeo Nishikawa, Kyoto (JP); Takashi Hyodo, Kusatsu (JP); Isao Fujihata, Matsumoto (JP); Masayuki Suetomi, Yokohama (JP); Masaaki Shimizu, Yokohama (JP)

(73) Assignee: OMRON Corporation, Kyoto-shi (JP)

( * ) Notice: Subject to any disclaimer, the term of this patent is extended or adjusted under 35 U.S.C. 154(b) by 49 days.

(21) Appl. No.: 15/537,845

(22) PCT Filed: Jan. 25, 2016

(86) PCT No.: PCT/JP2016/052043
§ 371 (c)(1),
(2) Date: Jun. 19, 2017

(87) PCT Pub. No.: WO2016/121705
PCT Pub. Date: Aug. 4, 2016

(65) Prior Publication Data
US 2018/0013291 A1    Jan. 11, 2018

(30) Foreign Application Priority Data
Jan. 28, 2015    (JP) .................................. 2015-014222

(51) Int. Cl.
*H02J 3/32*    (2006.01)
*H02J 3/38*    (2006.01)
(Continued)

(52) U.S. Cl.
CPC ................ *H02J 3/383* (2013.01); *H02J 3/32* (2013.01); *H02M 1/34* (2013.01); *H02M 3/24* (2013.01);
(Continued)

(58) Field of Classification Search
CPC .... H02J 3/32; H02J 3/383; H02J 7/35; H02M 1/34; H02M 3/24; H02M 3/33584; H02M 7/68; H02M 2001/346
See application file for complete search history.

(56) References Cited

U.S. PATENT DOCUMENTS

2006/0139823 A1    6/2006 Shoji et al.
2009/0059622 A1    3/2009 Shimada et al.

FOREIGN PATENT DOCUMENTS

JP    2006-187147 A    7/2006
JP    4378400 B2    12/2009
(Continued)

OTHER PUBLICATIONS

The International Search Report of PCT/JP2016/052043 dated Apr. 26, 2016.

*Primary Examiner* — Hal Kaplan
(74) *Attorney, Agent, or Firm* — Metrolexis Law Group, PLLC

(57) ABSTRACT

A low-voltage circuit in a bidirectional DC-DC converter converts output AC power from a high-voltage circuit to DC power to charge a smoothing reactor and discharge the smoothing reactor, and includes an active snubber circuit including switching elements and each having a backward diode and a snubber capacitor. The snubber capacitor of the active snubber circuit has its one end connected to a drain end of the switching elements, and has its other end connected to a node between a center tap of a high-frequency transformer and a smoothing reactor.

10 Claims, 10 Drawing Sheets

(51) Int. Cl.
*H02M 1/34* (2007.01)
*H02M 3/24* (2006.01)
*H02M 7/68* (2006.01)
*H02M 3/335* (2006.01)
*H02J 7/35* (2006.01)

(52) U.S. Cl.
CPC ......... *H02M 3/33584* (2013.01); *H02M 7/68* (2013.01); *H02J 7/35* (2013.01); *H02M 2001/346* (2013.01)

(56) References Cited

FOREIGN PATENT DOCUMENTS

| | | |
|---|---|---|
| JP | 2011-045240 A | 3/2011 |
| JP | 2014-007914 A | 1/2014 |
| JP | 2014-045547 A | 3/2014 |
| JP | 5445915 B2 | 3/2014 |

BIDIRECTIONAL DC-DC CONVERTER, POWER CONDITIONER, AND DISTRIBUTED POWER SYSTEM

FIELD

The present invention relates to an isolated bidirectional DC-DC converter including a high-frequency transformer for performing, in a distributed power system including a power generator with a storage battery to reduce variations of output power, bidirectional conversion of power between a high-voltage end and a low-voltage end of the high-frequency transformer.

BACKGROUND

Renewable energy power generators, which generate power using clean, renewable energy, have been widespread to respond to the recent attention to global environmental issues. Such renewable energy power generators can have greatly varying outputs due to changes in weather. To reduce such output variations, systems combining a renewable energy power generator and a storage battery have been developed.

Such systems now focus on maintaining the charged level using the storage battery and reducing any sudden change in their output from the entire system. Similar attempts also use a cogeneration system or a fuel cell with a storage battery under such control. A system combining a power generator, such as a renewable energy power generator, a cogeneration system, or a fuel cell, with a storage battery described above is also referred to as a distributed power system.

A typical example of such distributed power systems is a photovoltaic system with a storage battery. The photovoltaic system connects a solar module, which is a direct current power source, to the utility grid using a power conditioner. The power conditioner usually includes a direct current-to-direct current (DC-DC) converter to which a solar module is connected, a bidirectional direct current-to-alternating current (DC-AC) inverter connected to the utility grid, and a bidirectional DC-DC converter having its high-voltage end connected to a node between the DC-DC converter and the DC-AC inverter and its low-voltage end connected to the storage battery.

This bidirectional DC-DC converter has the high-voltage end receiving and outputting high-voltage direct current power from or to the DC-DC converter to which a solar module is connected, and has the low-voltage end connected to the low-voltage storage battery. The high-voltage end DC power is converted first to AC power by a switching circuit. The voltage of the AC power is then converted by a high-frequency transformer. The resultant power is then converted back to DC power by the switching circuit. This enables bidirectional DC-DC conversion between the high and low voltage ends. The DC-DC converter can charge the storage battery with power from the solar module and can discharge the power stored in the storage battery to a load.

The above bidirectional DC-DC converter includes the switching circuit to convert power between the high and low voltage ends. The on or off operation of a switching element included in the switching circuit may generate a reverse recovery current or a surge voltage. A reverse recovery current or a surge voltage can overload the switching element instantaneously and break the switching element. An active snubber may be used to reduce the influence of a reverse recovery current or a surge voltage and to prevent the power efficiency of the circuit from decreasing. The active snubber temporarily charges a capacitor with a surge current and discharges the surge current in addition to a transfer current during power transfer to regenerate the energy.

One example using a known active snubber may be a secondary converter circuit including a pair of switching elements including an antiparallel diode and a parallel capacitor and connected to a secondary end of a high-frequency transformer, an energy storage element connected to a center tap of the high-frequency transformer, and a voltage clamp circuit arranged between the high-frequency transformer and the switching elements of the secondary converter circuit. The voltage clamp circuit includes a pair of series circuits each including a capacitor and a switching element having an antiparallel diode, which are connected in parallel with their polarities being reversed (refer to, for example, Patent Literature 1).

Another known example is a low-voltage switching circuit including a group of first switching elements, a smoothing reactor, a second smoothing capacitor, and a voltage clamp circuit. The group of first switching elements is connected to a second direct current power source and a secondary winding of a transformer. The smoothing reactor is connected to the group of first switching elements and/or the secondary winding of the transformer. The second smoothing capacitor has one end connected to one end of a switching element of the group of first switching elements, has the other end connected to one end of the smoothing reactor, and is connected in parallel to the second direct current power source. The voltage clamp circuit is connected to a switching element of the group of first switching elements, and includes a clamp capacitor and a group of second switching elements including at least one switching element (refer to, for example, Patent Literature 2).

However, the first technique described above uses multiple capacitors in the active snubber (voltage clamp circuit). This may complicate the system configuration, and cannot decrease the cost. The second technique uses a clamp capacitor in the active snubber (voltage clamp circuit) arranged between the negative end of the second direct current power source and the group of second switching elements, increasing the voltage applied to the clamp capacitor. This increases the breakdown voltage and the capacity of the clamp capacitor, and cannot decrease the cost.

CITATION LIST

Patent Literature

Patent Literature 1: Japanese Patent No. 5445915
Patent Literature 2: Japanese Patent No. 4378400

SUMMARY

Technical Problem

In response to the above issue, one or more aspects of the present invention are directed to a technique for simplifying the structure and reducing the cost of an active snubber that reduces deterioration or breakage of a switching element in a switching circuit of a bidirectional DC-DC converter under a reverse recovery current or a surge voltage occurring in the switching circuit.

Solution to Problem

In response to the above issue, one aspect of the present invention provides a bidirectional DC-DC converter that includes a primary converter circuit and a secondary converter circuit, and performs bidirectional conversion of power between the converter circuits through a high-frequency transformer. The secondary converter circuit converts alternating current power output from the primary converter circuit to direct current power. The bidirectional DC-DC converter further includes an active snubber circuit including a group of switching elements each including a backward diode and connected in parallel and a snubber capacitor connected in series to the group of switching elements. The snubber capacitor in the active snubber circuit has one end connected to the group of switching elements and the other opposite end connected to a center tap of the high-frequency transformer.

In more detail, the bidirectional DC-DC converter includes a primary converter circuit that converts power between direct current power flowing through a first input-output terminal of the bidirectional DC-DC converter and alternating current power flowing through a primary winding of the high-frequency transformer, and a secondary converter circuit that converts power between alternating current power flowing through a secondary winding of the high-frequency transformer and direct current power flowing through a second input-output terminal of the bidirectional DC-DC converter and converts alternating current power output from the primary converter circuit to direct current power. The secondary converter circuit includes a first group of switching elements each including a backward diode and connected to a secondary coil of the high-frequency transformer. The primary converter circuit and the secondary converter circuit allow bidirectional conversion of power between the primary and secondary converter circuits. The secondary converter circuit further includes an active snubber circuit including a second group of switching elements each including a backward diode and connected in parallel and a snubber capacitor connected in series to the second group of switching elements. The snubber capacitor in the active snubber circuit has a first end connected to the second group of switching elements and a second end opposite to the first end and connected to a center tap of the high-frequency transformer.

The active snubber including the single snubber capacitor can reduce deterioration or breakage of a switching element included in a switching circuit of a bidirectional DC-DC converter under a reverse recovery current or a surge voltage occurring in the switching circuit. This structure allows one end of the snubber capacitor to be connected to the center tap of the high-frequency transformer, instead of the negative end of the above second input-output terminal. This lowers the voltage applied to the snubber capacitor further, and thus allows use of a snubber capacitor with a low breakdown voltage.

This simplifies the structure and reduces the cost of the active snubber circuit.

In the bidirectional DC-DC converter according to the above aspect, the secondary converter circuit includes a smoothing capacitor connected between a positive terminal and a negative terminal at an input-output terminal of the secondary converter circuit, and a smoothing reactor functioning as an energy storage element and having a first end connected to the positive terminal and to the smoothing capacitor. The secondary winding of the high-frequency transformer includes a first secondary winding and a second secondary winding, a first end of the first secondary winding and a first end of the second secondary winding are connected to each other to form a center tap, and the center tap is connected to a second end of the smoothing reactor opposite to the first end. The first group of switching elements includes a first switching element and a second switching element. The second group of switching elements includes a third switching element and a fourth switching element. The first switching element has a drain connected to a source of the third switching element and to a second end of the first secondary winding opposite to the center tap. The second switching element has a drain connected to a source of the fourth switching element and a second end of the second secondary winding opposite to the center tap. The first switching element and the second switching element have sources connected to the negative terminal and to the smoothing capacitor. The first end of the snubber capacitor is connected to drains of the third switching element and the fourth switching element, and the second end of the snubber capacitor opposite to the first end is connected to the center tap of the high-frequency transformer and to the second end of the smoothing reactor.

Another aspect of the present invention provides a power conditioner including the above bidirectional DC-DC converter, a DC-DC converter that raises an output voltage from a direct current power source or a solar module, and input the voltage to the bidirectional DC-DC converter, and a bidirectional DC-AC converter that converts direct current outputs from the bidirectional DC-DC converter and the DC-DC converter to alternating currents and transfer or receive alternating current power to or from a utility grid or a load.

Another aspect of the present invention provides the power conditioner further including a controller that controls an on or off operation of the switching elements in the bidirectional DC-DC converter to control an amount of direct current power that is input to or output from the first input/output terminal and the second input/output terminal of the bidirectional DC-DC converter.

Another aspect of the present invention provides a distributed power system including the above power conditioner, a power generator that outputs power to the DC-DC converter, and a storage battery that stores power and that is to be charged with power or discharge power through the bidirectional DC-DC converter in accordance with a difference between an amount of power from the power generator and an amount of electric load.

Advantageous Effects

One or more embodiments of the present invention simplify the structure and reduce the cost of an active snubber that can reduce deterioration or breakage of a switching element included in a switching circuit of a bidirectional DC-DC converter under a reverse recovery current or a surge voltage occurring in the switching circuit.

DETAILED DESCRIPTION

Embodiments of the present invention will now be described in detail by way of example with reference to the drawings.

First Embodiment

Figure 1:
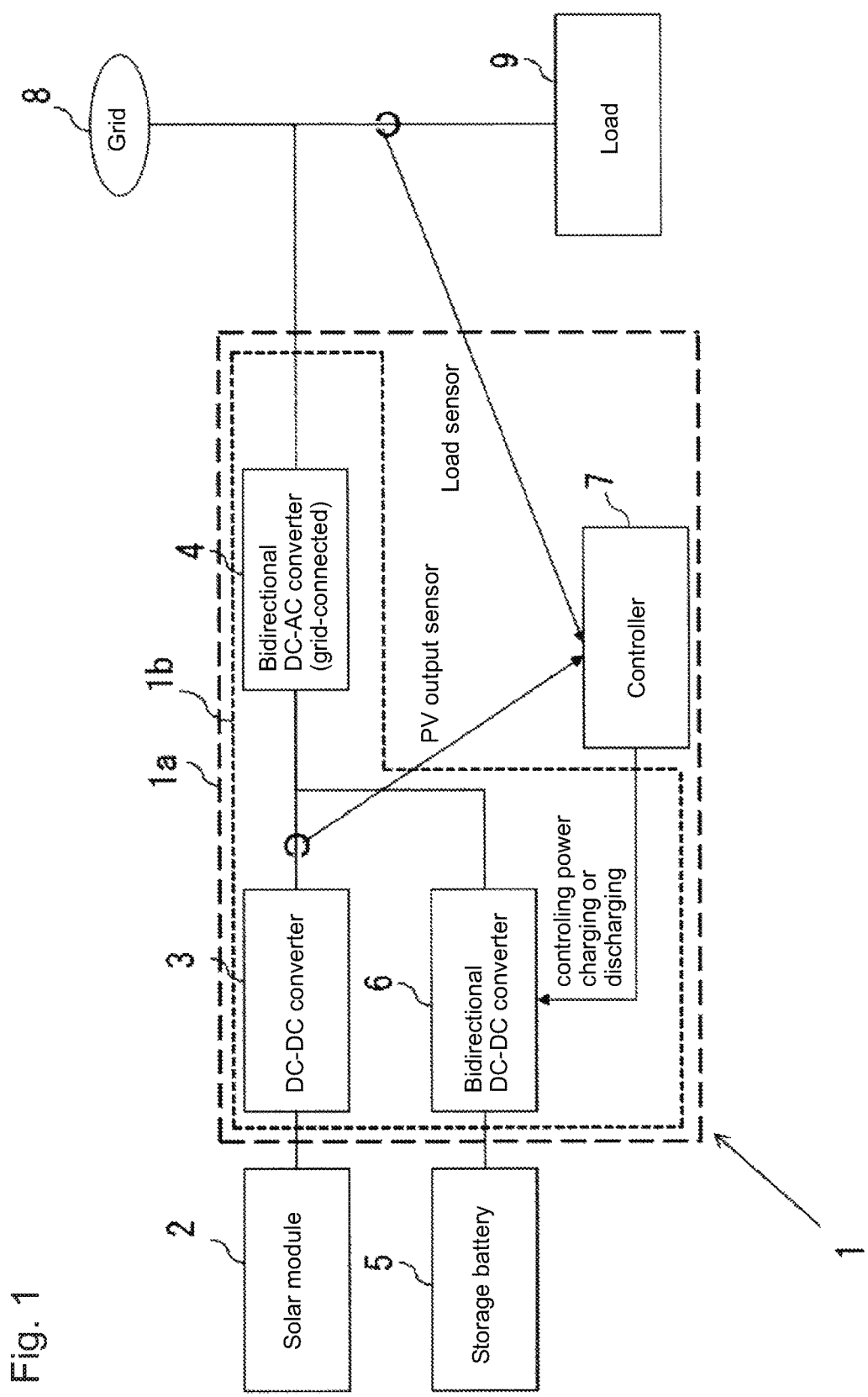
FIG. 1 is a block diagram of a photovoltaic system according to one embodiment.

FIG. 1 is a schematic block diagram of a photovoltaic system 1 including a bidirectional DC-DC converter according to the present embodiment. The photovoltaic system 1 includes a solar module 2, which is a direct current (DC) power source for generating power using solar energy. The solar module 2 outputs a direct current to a DC-DC converter 3, which raises the voltage of the input DC through voltage conversion to as high as 200 to 400 V. The output from the DC-DC converter 3 is then converted to an alternating current (AC) by a bidirectional DC-AC converter 4. The output from the bidirectional DC-AC converter 4 is connected to a grid 8 and a load 9.

When the grid 8 is operating normally, the photovoltaic system 1 is grid-connected, or is connected to the grid 8 during operation. In this grid-connected operation, the bidirectional DC-AC converter 4 outputs AC power to the grid 8 and the load 9. When the power output from the bidirectional DC-AC converter 4 is less than power consumed by the load 9, the insufficiency may be covered by power automatically fed from the grid 8 to the load 9. Conversely, when the power output from the bidirectional DC-AC converter 4 is more than power consumed by the load 9, the excess power may be automatically fed to the grid 8.

The photovoltaic system 1 according to the present embodiment includes a storage battery 5. The storage battery 5 has a DC output of as low as 30 to 60 V. The DC output from the storage battery 5 is connected to a bidirectional DC-DC converter 6, which converts this output voltage. The output of the bidirectional DC-DC converter 6 is connected to the output of the DC-DC converter 3.

When the power consumed by the load 9 is more than the power output from the solar module 2, the voltage of the DC power discharged from the storage battery 5 is raised by the bidirectional DC-DC converter 6 to supplement the output of the DC-DC converter 3 and to meet the power consumed by the load 9. As described above, the solar module 2 has greatly varying power outputs due to changes in weather and may degrade the quality of power by causing, for example, voltage fluctuations or frequency fluctuations of the grid 8. A power supply from the storage battery 5 thus reduces the fluctuations of output power from a combination of the solar module 2 and the storage battery 5.

When the power consumed by the load 9 is less than the power output from the solar module 2 and the power charged in the storage battery 5 is insufficient, a portion of power generated by the solar module 2 and is not fed to the load 9 is fed from the DC-DC converter 3 to the bidirectional DC-DC converter 6 to lower its voltage, and then fed to the storage battery 5 to charge it. When the power charged in the storage battery 5 is insufficient and a portion of power that is output from the solar module 2 and is not fed to the load 9 is insufficient to charge the storage battery 5, an AC output from the grid 8 may be converted to a DC by the bidirectional DC-AC converter 4, its voltage may be lowered by the bidirectional DC-DC converter 6, and then the resultant power may be fed to the storage battery 5.

The amount of power charging or discharging from the storage battery 5 is controlled by a microprocessor (not shown) included in a controller 7 controlling the bidirectional DC-DC converter 6 as well as by a program executed by the microprocessor. The controller 7 measures the power output from the DC-DC converter 3 using a photovoltaic (PV) output sensor, also measures the load power of the load 9 using a load sensor, and controls the power charging or discharging from the storage battery 5 in accordance with the difference between the output power and the load power.

The components enclosed with a broken line in FIG. 1, or the DC-DC converter 3, the bidirectional DC-AC converter 4, the controller 7, and the bidirectional DC-DC converter 6, may be housed together in a power conditioner 1a. The controller 7 may be an independent unit, and the other components enclosed in a dotted line, or the DC-DC converter 3, the bidirectional DC-AC converter 4, and the bidirectional DC-DC converter 6, may be housed together in a power conditioner 1b.

The bidirectional DC-DC converter 6 in the present embodiment will now be described in detail. Although the present embodiment uses an n-type metal-oxide-semiconductor field-effect transistor (nMOSFET) as a switching element, the switching element may not be this transistor but may be another transistor, such as a p-type metal-oxide-semiconductor field-effect transistor (pMOSFET) or an insulated-gate bipolar transistor (IGBT).

Figure 2:
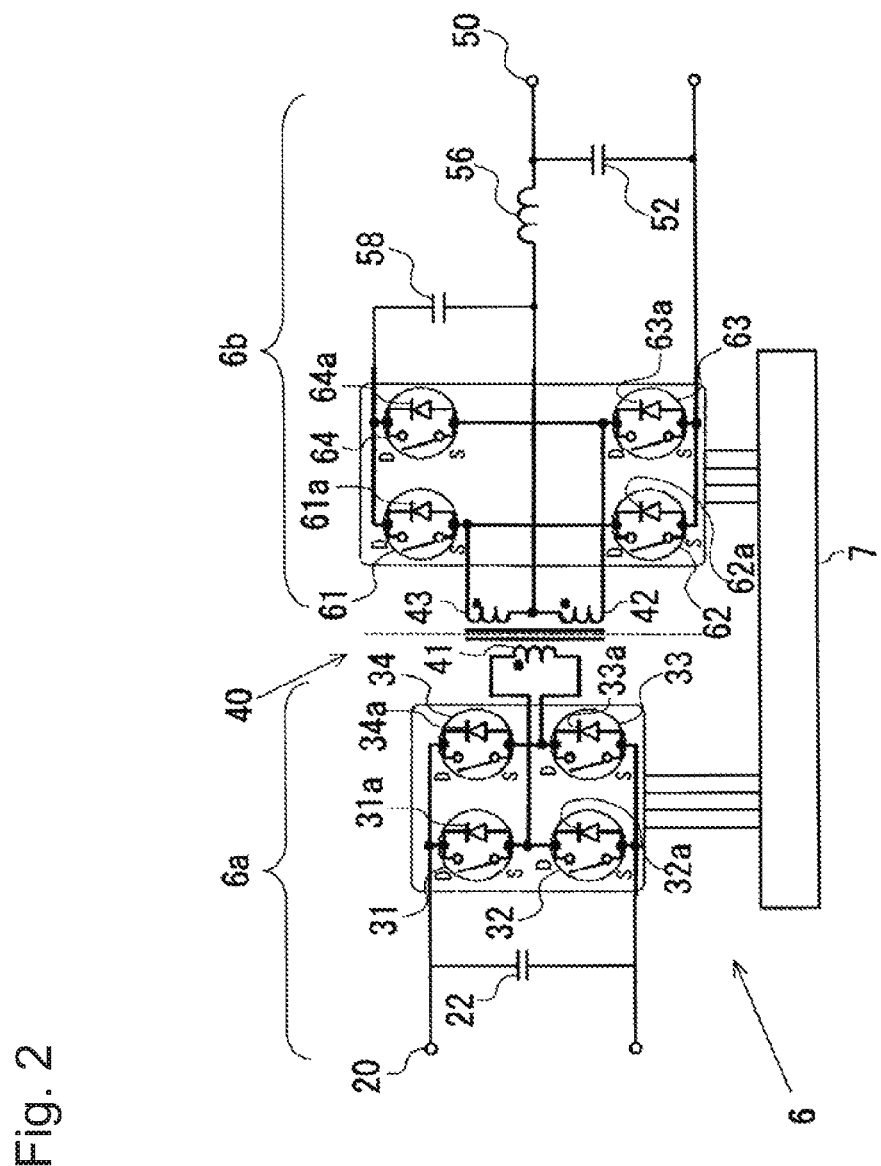
FIG. 2 is a block diagram of a bidirectional DC-DC converter according to the embodiment.

FIG. 2 is a circuit block diagram of the bidirectional DC-DC converter 6 according to the embodiment of the present invention. In FIG. 2, the bidirectional DC-DC converter 6 includes a high-voltage circuit 6a, which is a primary converter circuit on the left of a transformer 40 in the figure, and a low-voltage circuit 6b, which is a secondary converter circuit on the right of the transformer 40 in the figure. The high-voltage circuit 6a includes a smoothing capacitor 22, a first switching arm, and a second switching arm, which are connected in parallel to its input-output (I/O) terminal 20. The first switching arm is formed by connecting the source of a switching element 31 and the drain of a switching element 32. The second switching arm is formed by connecting the source of a switching element 34 and the drain of a switching element 33. As shown in FIG. 1, the I/O terminal 20 is connected to an output terminal of the DC-DC converter 3.

Each of the switching elements 31 to 34 has a corresponding one of backward diodes 31a to 34a connected between its source and its drain to allow a current to flow from the source to the drain. A primary winding 41 of the transformer 40 is connected between a node between the source of the switching element 31 and the drain of the switching element 32 and a node between the drain of the switching element 33 and the source of the switching element 34.

The low-voltage circuit 6b includes a smoothing capacitor 52 connected to its I/O terminal 50 between the positive terminal and the negative terminal. A smoothing reactor 56, which is an example of an energy storage element, is connected to the positive terminal. The transformer 40 includes a first secondary winding 42 and a second secondary winding 43 that are connected in series. The node (center tap) between these two secondary windings 42 and 43 is connected to one end of the smoothing reactor 56 opposite to the I/O terminal 50. The other end of the secondary winding 42 is connected to the drain of a switching element 63 and the source of a switching element 64. The other end of the secondary winding 43 is connected to the source of a switching element 61 and the drain of a switching element 62. The sources of the switching elements 62 and 63 are connected to the negative end of the I/O terminal 50. As shown in FIG. 1, the I/O terminal 50 is connected to a terminal of the storage battery 5.

The drains of the switching elements 61 and 64 are connected to one end of a snubber capacitor 58. The switching elements 61 and 64 and the snubber capacitor 58 form an active snubber, which will be described later. The source of the switching element 61 is connected to the drain of the switching element 62. The source of the switching element 64 is connected to the drain of the switching element 63. The other end of the snubber capacitor 58 is connected to the node (center tap) between the first secondary winding 42 and the second secondary winding 43 and to the end of the smoothing reactor 56 opposite to the I/O terminal 50.

Each of the switching elements 61 to 64 has a corresponding one of backward diodes 61a to 64a connected between its drain and its source to allow a current to flow from the source to the drain. The backward diode 61a to 64a may be body diodes of the switching elements 61 to 64. The switching elements 31 to 34 and the switching elements 61 to 64 are switched by the controller 7. The switching elements 62 and 63 correspond to a first group of switching elements. The switching elements 61 and 64 correspond to a second group of switching elements. The switching element 62 corresponds to a first switching element, the switching element 63 to a second switching element, the switching element 61 to a third switching element, and the switching element 64 to a fourth switching element.

When a current flowing through each of the switching elements 31 to 34 and 61 to 64 and the backward diodes 31a to 34a and 61a to 64a is turned off to change a voltage applied to the element, the current does not immediately reach zero, but allows a reverse recovery current with a reversed polarity to flow temporarily, and generates a surge voltage.

Figure 3:
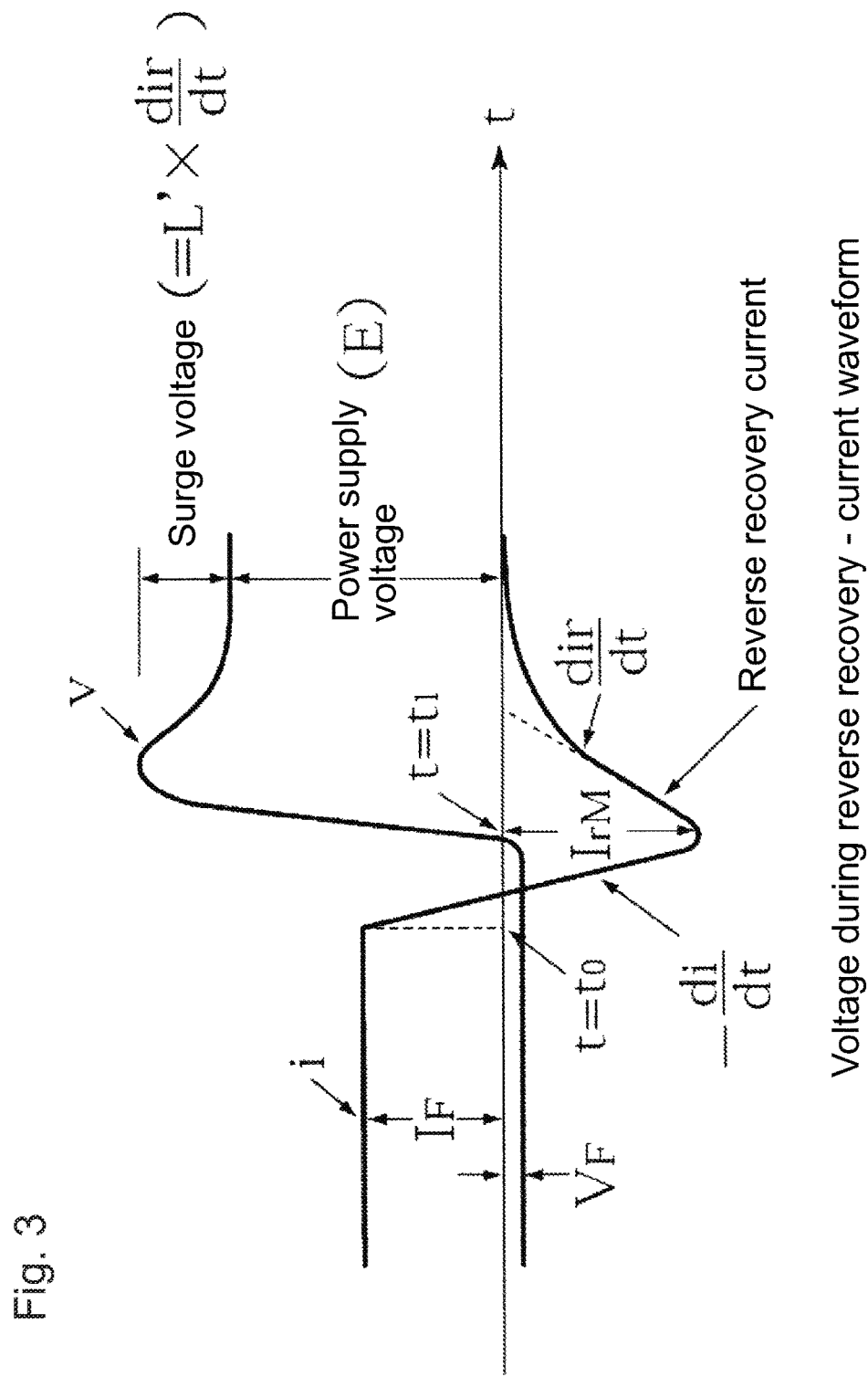
FIG. 3 is a graph showing changes in a voltage and a current during reverse recovery of a semiconductor device.

FIG. 3 is a graph showing the behaviors of a current and a voltage when the current flowing through the semiconductor device is turned off. In a left end portion of FIG. 3, VF is the voltage between the two terminals of the element, and IF is the current flowing through the element. When the element is turned off at time t0 in this state, the current does not immediately change to zero, but a reverse recovery current IrM having a reversed polarity flows temporarily, and then the current gradually approaches zero. The voltage does not immediately change from VF to the power supply voltage, but a surge voltage with a peak proportional to the decrease ratio dir/dt of the reverse recovery current, and then the voltage gradually approaches the power supply voltage. A constant L' of proportionality includes a parasitic inductance caused by the circuit configuration, in addition to the inductance of an actual reactor in the circuit. When a reverse recovery current or a surge voltage is applied to an element, the element may be instantaneously overloaded and broken. The present embodiment uses an active snubber to prevent the reverse recovery current and the surge voltage.

Before the operation is described in detail, the directions of currents in the circuit diagram of FIG. 2 will now be described. A current through each of the switching elements 31 to 34 and 61 to 64 and through each of the backward diodes 31a to 34a and 61a to 64a connected in parallel to the corresponding switching elements flows forward from the drain to the source. A current through the primary winding 41 flows forward from the first switching arm to the second switching arm. A current through the snubber capacitor 58 flows forward from the drain of each of the switching elements 61 and 64 to the smoothing reactor 56 or to the node between the secondary windings 42 and 43.

In a charging operation for transferring electric energy input from the I/O terminal 20 to the I/O terminal 50, a current through each of the secondary windings 42 and 43 and the smoothing reactor 56 flows forward from the secondary winding 42 or 43 to the positive end of the I/O terminal 50 through the node between the secondary windings 42 and 43 and the smoothing reactor 56. In a discharging operation for transferring electric energy input from the I/O terminal 50 to the I/O terminal 20, a current through each of the secondary windings 42 and 43 and the smoothing reactor 56 flows forward from the positive end of the I/O terminal 50 to the secondary winding 42 or 43 through the node between the secondary windings 42 and 43.

The operation of the bidirectional DC-DC converter 6 will now be described in detail. The charging operation refers to the operation for transferring electric energy input from the I/O terminal 20 to the I/O terminal 50. The discharging operation refers to the operation for transferring electric energy from the I/O terminal 50 to the I/O terminal 20.

Charging Operation

The charging operation of the bidirectional DC-DC converter 6 will now be described. The basic charging operation of the low-voltage circuit 6b included in the bidirectional DC-DC converter 6 will now be described without using the function of an active snubber with reference to FIGS. 4A and 4B.

Phase 1

Figure 4A:
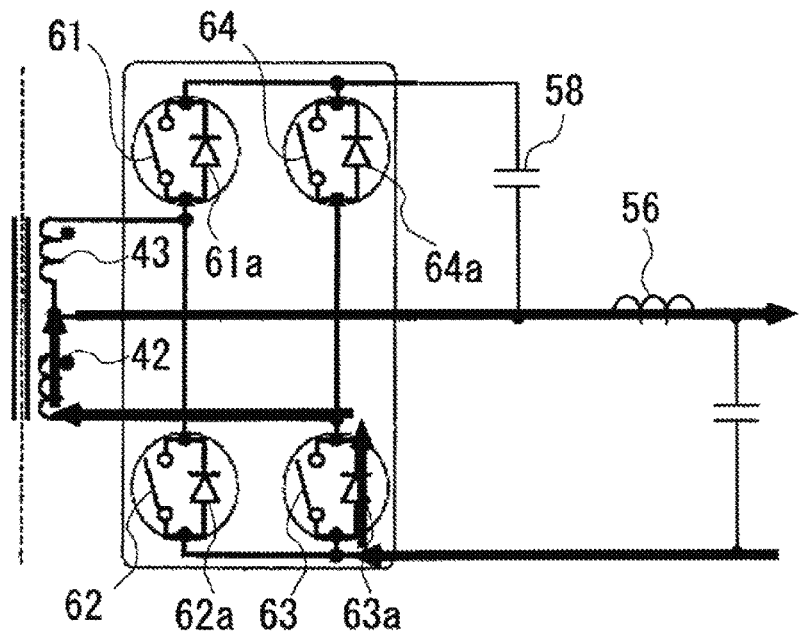
FIGS. 4A and 4B are diagrams describing a basic charging operation of a low-voltage circuit included in the bidirectional DC-DC converter.

In phase 1, the switching elements 31 and 33 are on and the current flows forward (from top to bottom in the figure) through the primary winding 41 in the high-voltage circuit 6a shown in FIG. 2. In the low-voltage circuit 6b, as shown in FIG. 4A, the current flows forward (from bottom to top in the figure) through the secondary winding 42. The current then flows from the negative end of the I/O terminal 50 through a backward diode 63a of the switching element 63, and is rectified. The current flowing through the secondary winding 42 then passes through the smoothing reactor 56.

Phase 2

Figure 4B:
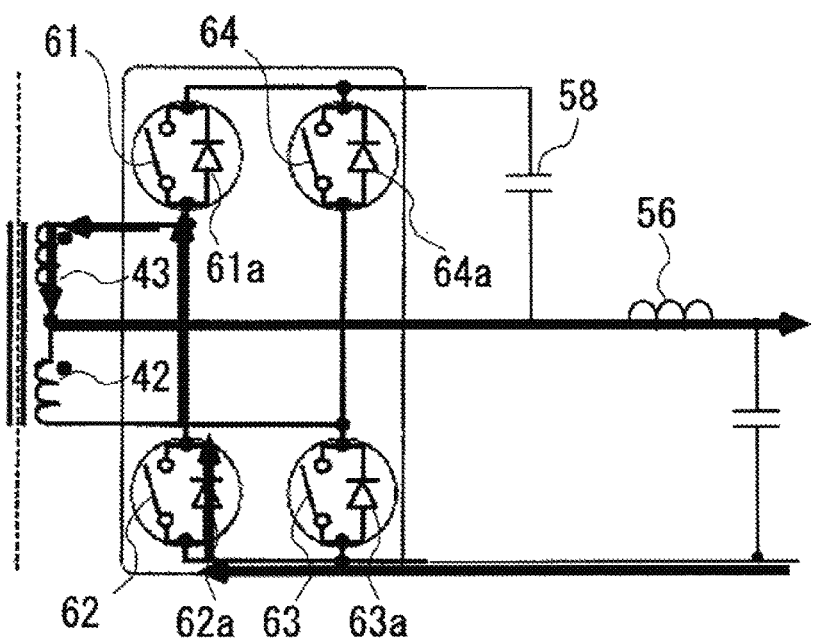

In phase 2, the switching elements 32 and 34 are on and the current flows backward (from bottom to top in the figure) through the primary winding 41 in the high-voltage circuit 6a shown in FIG. 2. In the low-voltage circuit 6b, the current flowing through the transformer 40 is reversed and flows forward (from top to bottom in the figure) through the secondary winding 43 as shown in FIG. 4B. In this phase, the current flows through a backward diode 62a of the switching element 62 and is rectified. During the charging operation of the low-voltage circuit 6b, the operations of phases 1 and 2 described above are repeated to transfer electric energy to the I/O terminal 50 by lowering the voltage input from the I/O terminal 20 using the transformer 40 and to charge the storage battery 5 located after the I/O terminal 50.

In the charging operation described above, the current flowing through the backward diode 63a is turned off in the transition from phase 1 to phase 2. In the subsequent transition from phase 2 to phase 1, the current flowing through the backward diode 62a is turned off. At the phase transition, a reverse recovery current flows through and a surge voltage occurs in each backward diode. This may break the backward diode 62a or 63a.

Discharging Operation

The discharging operation of the bidirectional DC-DC converter 6 will now be described. The basic discharging operation of the low-voltage circuit 6b included in the bidirectional DC-DC converter 6 will now be described without using the function of the active snubber with reference to FIGS. 5A to 5D.

Phase 1

Figure 5A:
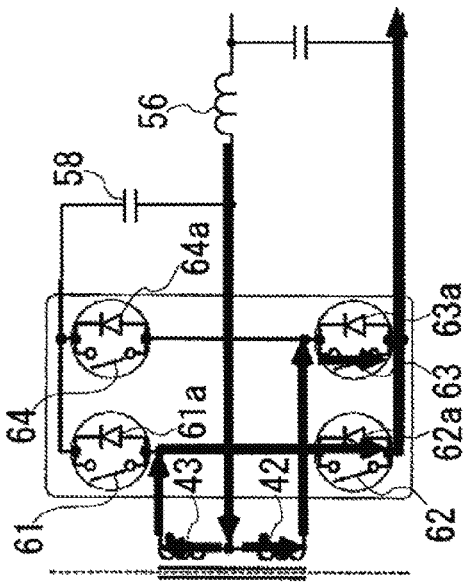
FIGS. 5A to 5D are diagrams describing a basic discharging operation of the low-voltage circuit included in the bidirectional DC-DC converter.

FIG. 5A shows the state of the current in phase 1 of the discharging operation of the storage battery 5 that is connected to the I/O terminal 50. In the low-voltage circuit 6b in the bidirectional DC-DC converter 6, the switching elements 62 and 63 are first both turned on. The current thus flows forward through the smoothing reactor 56 and the secondary windings 42 and 43 of the transformer 40. More specifically, as shown in FIG. 5A, the current flows from bottom to top in the figure through the secondary winding 43 and from top to bottom in the figure through the secondary winding 42.

In this state, power flows through the secondary windings 42 and 43 in opposite directions from the node, and thus the power is not transferred. The electric energy discharged from the storage battery 5 during this period is thus stored in the smoothing reactor 56. The current flows in parallel through the switching elements 62 and 63. In this structure, the current flowing through each of the switching elements 62 and 63 is half the current flowing through one switching element included in another structure. This reduces power loss in each of the switching elements 62 and 63 and improves the energy efficiency of the circuit.

Phase 2

Figure 5B:
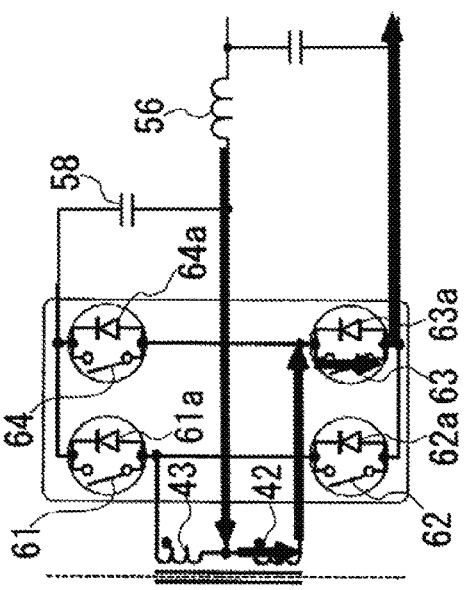

FIG. 5B shows the state of the current in phase 2 of the discharging operation of the storage battery 5 that is connected to the I/O terminal 50. As shown in the figure, when the switching element 63 is turned off in this phase, no current flows through the secondary winding 42 of the transformer 40, and the current flows only through the secondary winding 43. The current flowing through the secondary winding 43 thus transfers the electric energy discharged from the storage battery 5 to the high-voltage circuit 6a. The electric energy stored in the smoothing reactor 56 in phase 1 is together transferred to the high-voltage circuit 6a through the transformer 40 to raise the voltage more efficiently.

Phase 3

Figure 5C:
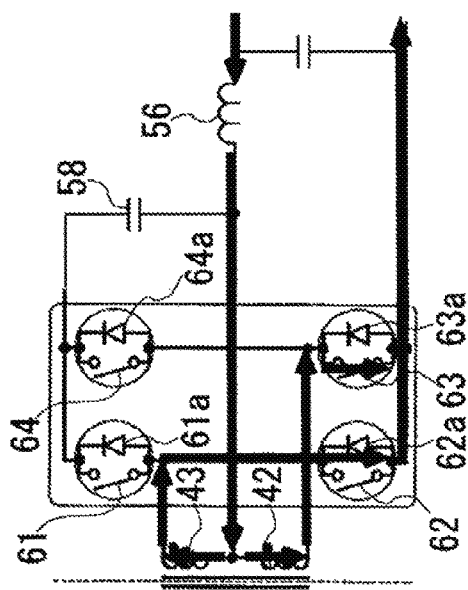

FIG. 5C shows the state of the current in phase 3. As shown in the figure, the switching element 63 is turned on again in phase 3. In this state, the switching elements 62 and 63 are both on. The current flows forward through the smoothing reactor 56 and the secondary windings 42 and 43 of the transformer 40. This again stops transfer of electric energy. The electric energy is stored in the smoothing reactor 56. In the same manner as described above, the switching elements 62 and 63 are arranged in parallel. In this case, the current flowing through each switching element is half. This improves the energy efficiency of the circuit.

Phase 4

Figure 5D:
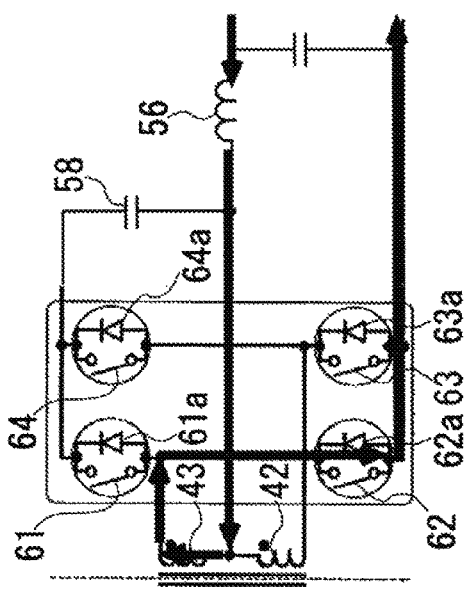

FIG. 5D shows the state of the current in phase 4. As shown in the figure, the switching element 62 is turned off in phase 4. Thus, no current flows through the secondary winding 43 of the transformer 40, and the current flows only through the secondary winding 42. The current flowing through the secondary winding 42 thus transfers the electric energy discharged from the storage battery 5 to the high-voltage circuit 6a. The electric energy stored in the smoothing reactor 56 in phase 3 is together transferred to the high-voltage circuit 6a through the transformer 40 to raise the voltage more efficiently.

As described above, phases 1 to 4 are repeated in the discharging operation of the storage battery 5 that is connected to the I/O terminal 50. However, in the transition from phase 1 to phase 2, a reverse recovery current or a surge voltage may occur in the switching element 63 when the switching element 63 is turned off and no current flows. Similarly, in the transition from phase 3 to phase 4, a reverse recovery current or a surge voltage may occur in the switching element 62 when the switching element 62 is turned off and no current flows. This may break the switching elements 62 and 63.

The state of the current through the low-voltage circuit 6b when the bidirectional DC-DC converter 6 charges and discharges the storage battery 5 using an active snubber to respond to the above issue will now be described.

Charging Operation

FIGS. 6A to 8C show the states of the current during the charging operation of the low-voltage circuit 6b using an active snubber according to the present embodiment.

Phase 1

Figure 6A:
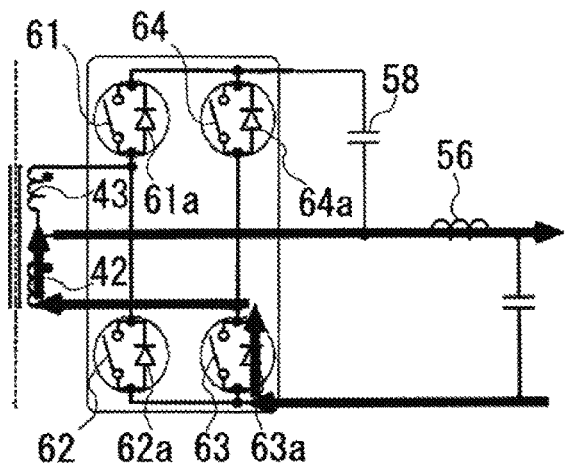
FIGS. 6A to 6C are diagrams describing phases 1 to 3 of the charging operation of the low-voltage circuit included in the bidirectional DC-DC converter according to the embodiment.
Figure 6B:
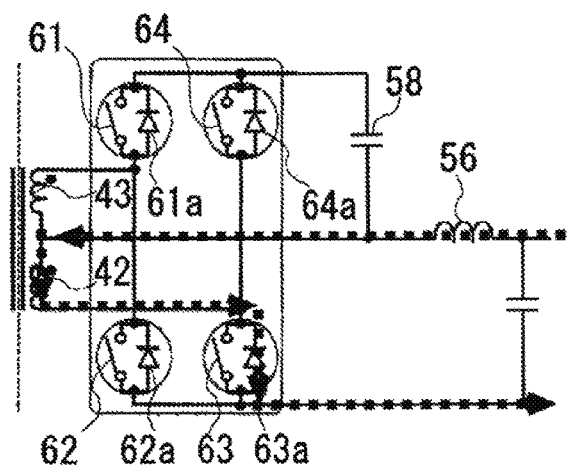

Phase 1 shown in FIG. 6A is the same state as shown in FIG. 4A. More specifically, in the high-voltage circuit 6a, the switching elements 31 and 33 are on, the switching elements 32 and 34 are off, and the current flows forward (from top to bottom in the figure) through the primary winding 41. In the low-voltage circuit 6b, the current flows forward (from bottom to top in the figure) through the secondary winding 42, and the current flows from the negative end of the I/O terminal 50 through the backward diode 63a of the switching element 63 and is rectified.

Phase 2

In the high-voltage circuit 6a of the bidirectional DC-DC converter 6 in phase 2, the switching elements 32 and 34 are on and the switching elements 31 and 33 are off. An output voltage from the DC-DC converter 3, which is received through the I/O terminal 20, is applied to the primary winding 41 of the transformer 40 through the switching elements 32 and 34. This causes a current to flow backward (from bottom to top in FIG. 2) through the primary winding 41. This operation reverses the magnetic field produced in the transformer 40, and turns off the current flowing through the backward diode 63a included in the low-voltage circuit 6b. As indicated by the dotted arrows in FIG. 6B, a reverse recovery current starts flowing through the backward diode 63a and increases.

Phase 3

Figure 6C:
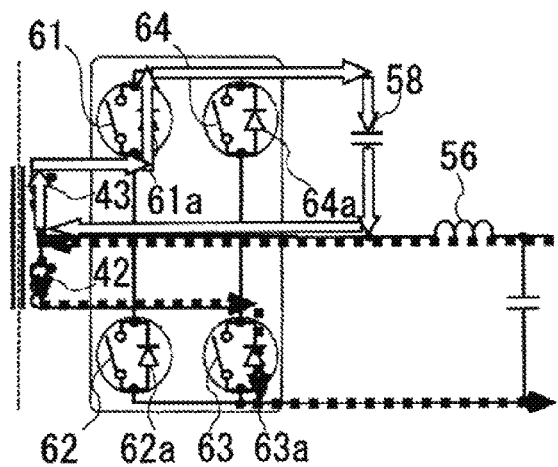

In phase 3, as shown in FIG. 6C, the absolute value of the reverse recovery current suddenly drops to zero in the second half of the period during which the reverse recovery current is flowing. In this state, the ratio dir/dt and the constant L' cause a surge voltage in the backward diode 63a in a direction that reduces a decrease in the magnetic flux. As indicated by solid-white arrows in FIG. 6C, the resultant electric energy is charged into the snubber capacitor 58 included in the active snubber through the backward diode 61a of the switching element 61.

Phase 4

Figure 7A:
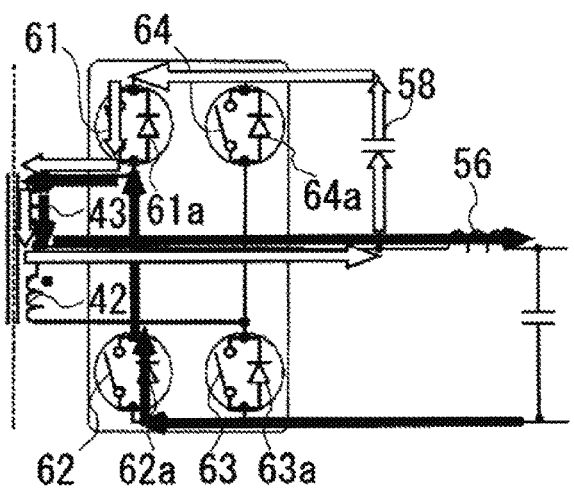
FIGS. 7A to 7C are diagrams describing phases 4 to 6 of the charging operation of the low-voltage circuit included in the bidirectional DC-DC converter according to the embodiment.
Figure 7B:
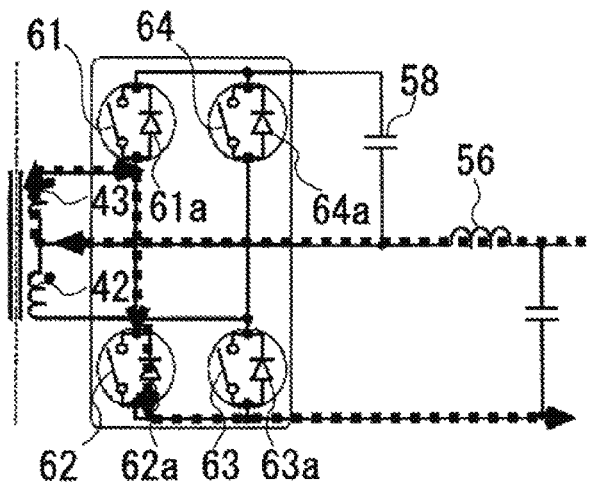

In phase 4 shown in FIG. 7A, the switching elements 32 and 34 continue to be on and the current continues to flow backward (from bottom to top in the figure) through the primary winding 41 in the high-voltage circuit 6a. In this phase, in the low-voltage circuit 6b, no reverse recovery current flows through the backward diode 63a of the switching element 63. As indicated with solid-black arrows in FIG. 7A, the current is rectified by the backward diode 62a of the switching element 62 and continues to flow forward (from top to bottom in the figure) through the secondary winding 43. The controller 7 turns on the switching element 61 to allow a current to flow in the same direction through the secondary winding 43. Concurrently, the electric energy stored in the snubber capacitor 58 included in the active snubber is discharged, as indicated with solid-white arrows in FIG. 7A to regenerate the energy.

Phase 5

In phase 5, in the high-voltage circuit 6a, the switching elements 31 and 33 are on and the current flowing through the primary winding 41 is reversed again to flow forward (from top to bottom in the figure). In the low-voltage circuit 6b, the current flowing through the backward diode 62a of the switching element 62 is turned off. Thus, as indicated with the dotted line in FIG. 7B, a reverse recovery current flowing through the backward diode 62a increases, and the current flows backward (from bottom to top in the figure) through the secondary winding 43.

Phase 6

Figure 7C:
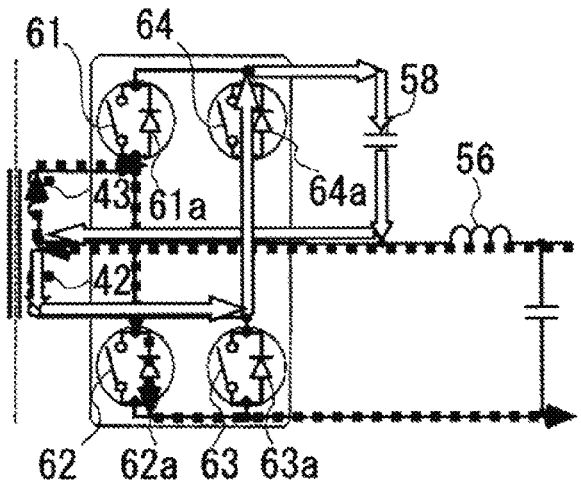

In phase 6, as shown in FIG. 7C, the absolute value of the reverse recovery current flowing through the backward diode 62a suddenly drops to almost zero in the second half of the period during which the reverse recovery current is flowing. In this state, the ratio dir/dt and the constant L' cause a surge voltage in the backward diode 62a in a direction that reduces a decrease in the magnetic flux. The resultant electric power charges the snubber capacitor 58 included in the active snubber through the backward diode 64a of the switching element 64.

Phase 7

Figure 8A:
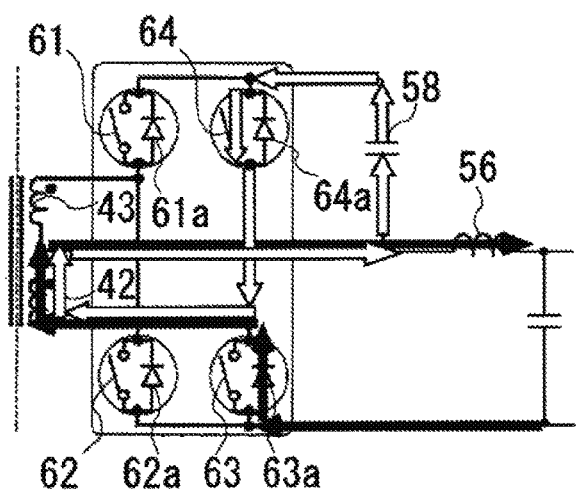
FIGS. 8A to 8C are diagrams describing phases 7 to 9 of the charging operation of the low-voltage circuit included in the bidirectional DC-DC converter according to the embodiment.
Figure 8B:
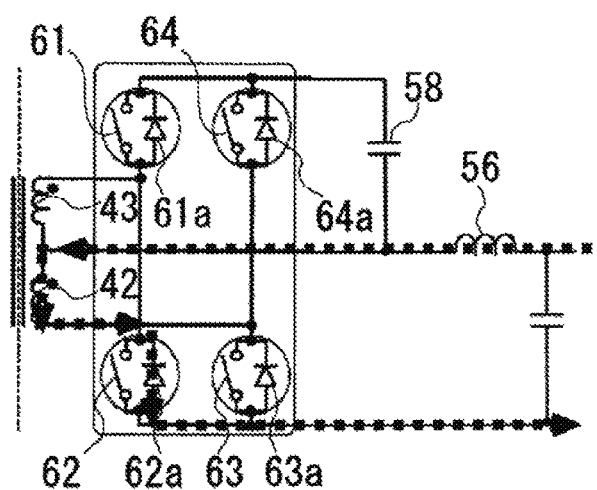
Figure 8C:
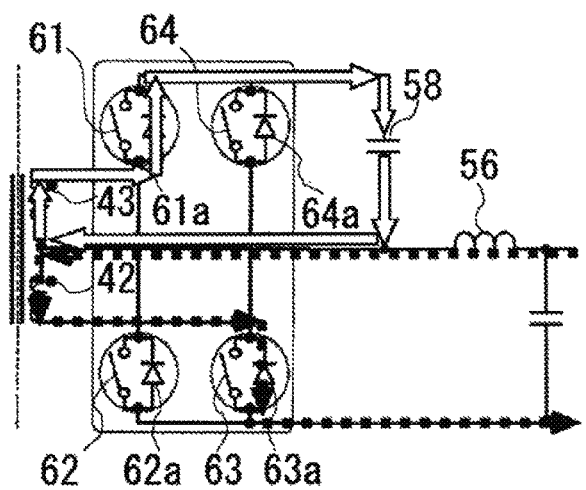

In phase 7 shown in FIG. 8A, the switching elements 31 and 33 continue to be on, the current continue to flow forward (from top to bottom in the figure) through the primary winding 41 in the high-voltage circuit 6a, and no reverse recovery current flows through the backward diode 62a of the switching element 62. In this phase, in the low-voltage circuit 6b, the current is rectified by the backward diode 63a of the switching element 63 and continues to flow forward (from bottom to top in the figure) through the secondary winding 42 as indicated with solid-black arrows in FIG. 8A. At this timing, the controller 7 turns on the switching element 64 to allow a current to flow in the same direction through the secondary winding 42. Concurrently, the electric energy stored in the snubber capacitor 58 included in the active snubber is discharged, as indicated with solid-white arrows in FIG. 8A to regenerate the energy. As shown in FIGS. 8B and 8C, phases 1 to 7 are repeated.

Discharging Operation

FIGS. 9A to 10D show the states of the current during the discharging operation of the low-voltage circuit 6b using the active snubber according to the present embodiment.

Phase 1

Figure 9A:
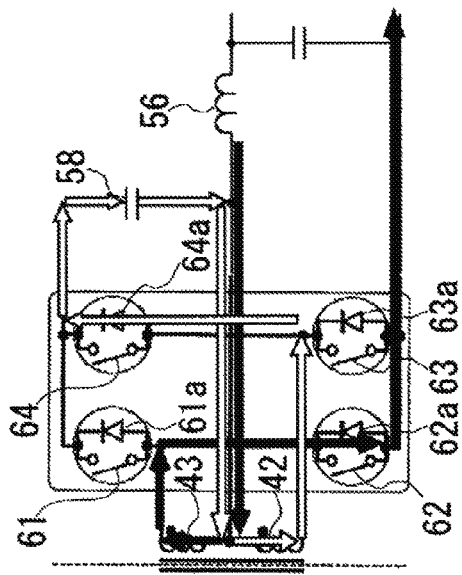
FIGS. 9A to 9D are diagrams describing phases 1 to 4 of the discharging operation of the low-voltage circuit included in the bidirectional DC-DC converter according to the embodiment.

FIG. 9A shows the state of the current in phase 1 of the discharging operation of the storage battery 5 that is connected to the I/O terminal 50. This state is the same as phase 1 in the basic discharging operation of the low-voltage circuit 6b in the bidirectional DC-DC converter 6 shown in FIG. 5A. More specifically, the switching elements 62 and 63 are both turned on and the current flows forward through the smoothing reactor 56 and the secondary windings 42 and 43 of the transformer 40. In this state, power flows through the secondary windings 42 and 43 in opposite directions from the node, and thus the power is not transferred. The electric energy discharged from the storage battery 5 during this period is thus stored in the smoothing reactor 56.

Phase 2

Figure 9B:
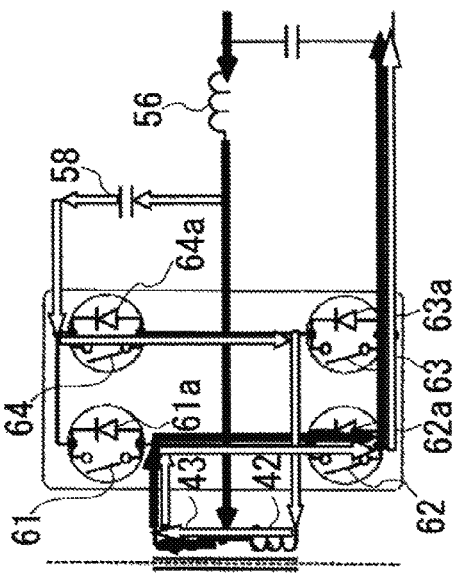

FIG. 9B shows the state of the current in phase 2. This state is the same as phase 2 in the basic discharging operation of the low-voltage circuit 6b in the bidirectional DC-DC converter 6 shown in FIG. 5B. More specifically, when the switching element 63 is turned off in this phase, no current flows through the secondary winding 42 of the transformer 40, and the current flows only through the secondary winding 43. The current flowing through the secondary winding 43 thus transfers the electric energy discharged from the storage battery 5 to the high-voltage circuit 6a. The electric energy stored in the smoothing reactor 56 in phase 1 is together transferred to the high-voltage circuit 6a through the transformer 40.

Phase 3

Figure 9C:
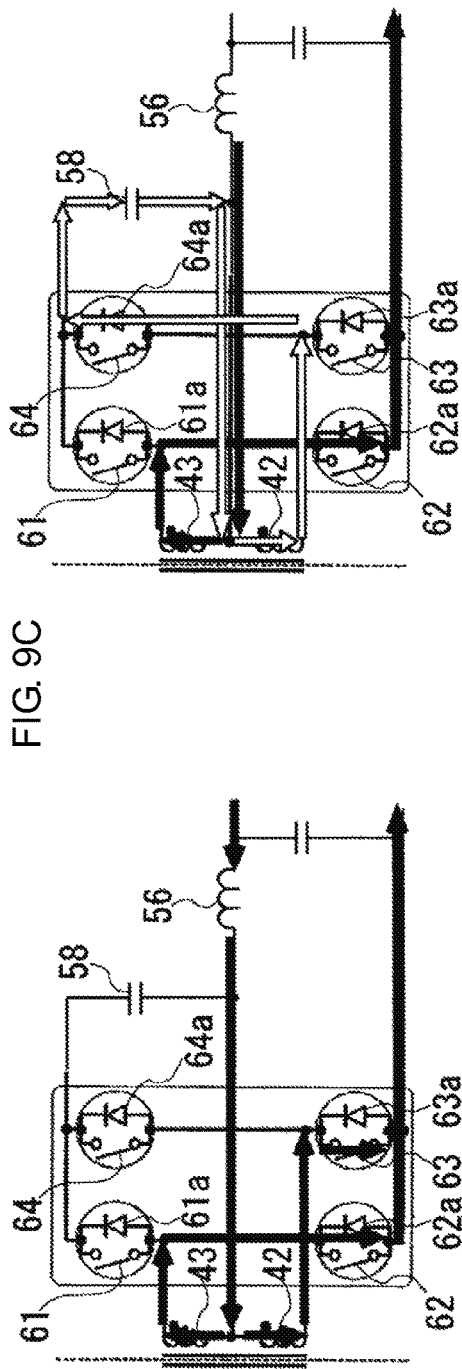

In phase 2 above, as shown in FIG. 9B, the switching element 63 that has been on is turned off. This causes the magnetic flux of the transformer 40 to decrease immediately. In response to this, a surge voltage occurs in a direction that reduces a change in the magnetic flux in phase 3 as shown in FIG. 9C. The resultant electric energy is stored into the snubber capacitor 58 included in the active snubber through the backward diode 64a of the switching element 64.

Phase 4

Figure 9D:
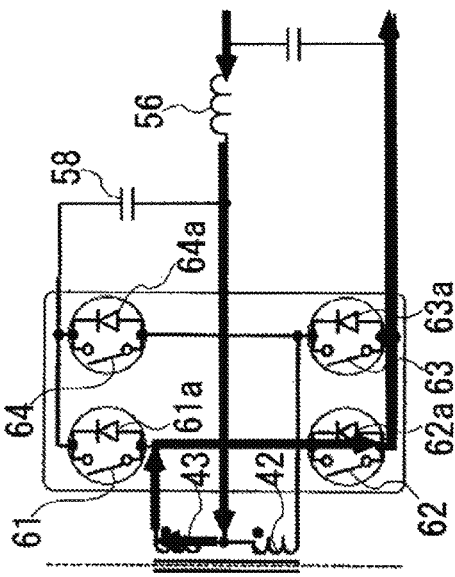

In phase 4, as shown in FIG. 9D, the controller 7 turns on the switching element 64 at the end of the decrease of the magnetic flux. Thus, the electric energy stored in the snubber capacitor 58 included in the active snubber in phase 3 is transferred in the same direction to the secondary winding 42 of the transformer 40 to regenerate the energy.

Phase 5

Figure 10A:
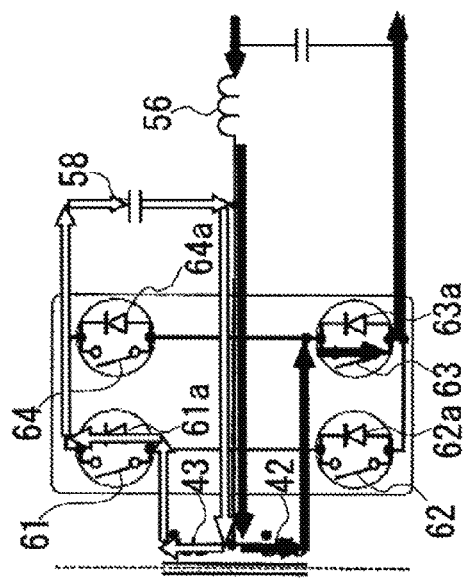
FIGS. 10A to 10D are diagrams describing phases 5 to 8 of the discharging operation of the low-voltage circuit included in the bidirectional DC-DC converter according to the embodiment.

FIG. 10A shows the state of the current in phase 5. As shown in FIG. 10A, phase 5 is the same as phase 3 of the basic discharging operation of the low-voltage circuit 6b included in the DC-DC converter 6 shown in FIG. 5C. More specifically, the switching element 63 is turned on again, and the switching elements 62 and 63 are both on. In this state, the current flows forward through the smoothing reactor 56 and the secondary windings 42 and 43 of the transformer 40. This again stops transfer of electric energy. The electric energy is stored in the smoothing reactor 56.

Phase 6

Figure 10B:
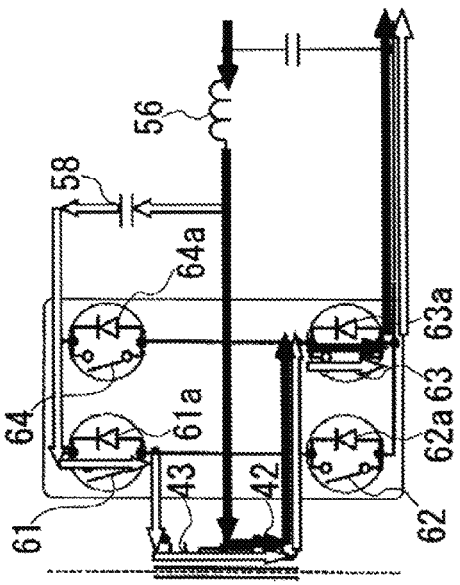

FIG. 10B shows the state of the current in phase 6. As shown in FIG. 10B, phase 6 is the same as phase 4 in the basic discharging operation of the low-voltage circuit 6b included in the DC-DC converter 6 shown in FIG. 5D. More specifically, the switching element 62 is turned off, no current flows through the secondary winding 43 of the transformer 40, and the current flows only through the secondary winding 42. The current flowing through the secondary winding 42 thus transfers the electric energy discharged from the storage battery 5 to the high-voltage circuit 6a. The electric energy stored in the smoothing reactor 56 in phase 5 is together transferred to the high-voltage circuit 6a through the transformer 40.

Phase 7

Figure 10C:
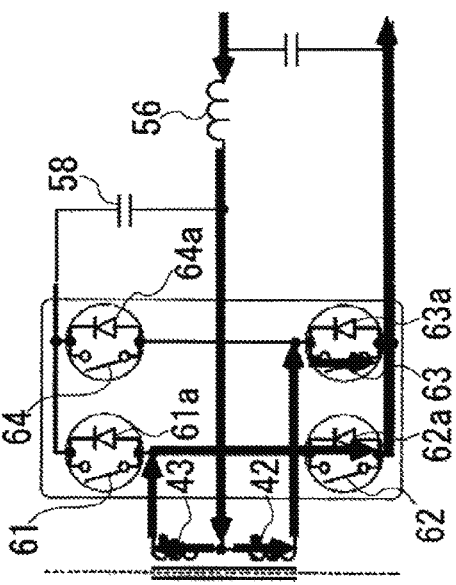

In phase 6, as shown in FIG. 10B, the switching element 62 that has been on is turned off. This causes the magnetic flux of the transformer 40 to decrease immediately. In response to this, a surge voltage occurs in a direction that reduces a change in the magnetic flux in phase 7 as shown in FIG. 10C. The resultant electric energy is stored into the snubber capacitor 58 included in the active snubber through the backward diode 61a of the switching element 61.

Phase 8

Figure 10D:
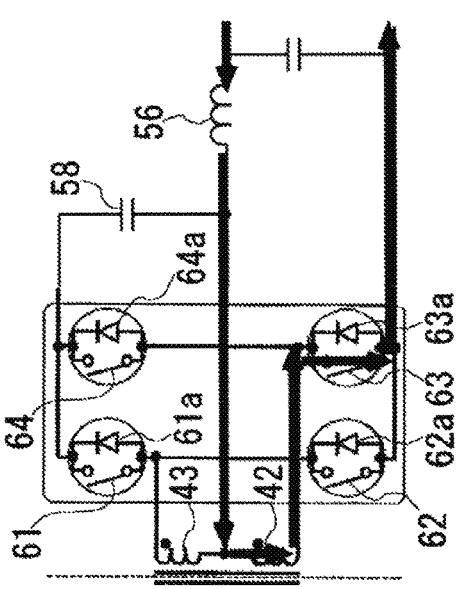

In phase 8, as shown in FIG. 10D, the controller 7 turns on the switching element 61 at the end of the decrease of the magnetic flux. Thus, the electric energy stored in the snubber capacitor 58 included in the active snubber in phase 7 is transferred in the same direction to the secondary windings 42 and 43 of the transformer 40 to regenerate the energy.

In the present embodiment described above, the active snubber is arranged in the low-voltage circuit 6b in the bidirectional DC-DC converter 6 to reduce the influence of a reverse recovery current and a surge voltage that can occur when the switching elements or the corresponding backward diodes are turned off. This structure prevents breakage of the switching elements or the corresponding backward diodes.

In the present embodiment, the snubber capacitor 58 included in the active snubber has one end connected to the drains of the switching elements 61 and 64 in the active snubber and has the other end connected to the node between the secondary windings 42 and 43 of the transformer and the end of the smoothing reactor 56 opposite to the I/O terminal 50. This allows the switching elements 61 and 64 and the single snubber capacitor 58 to form the active snubber. This structure reduces the voltage applied to the snubber capacitor 58 and allows the snubber capacitor 58 to have a smaller capacity than the structure including the snubber capacitor 58 connected to the drains of the switching elements 61 and 64 and the negative end of the I/O terminal 50. This also reduces the cost of the device.

In the present embodiment, the high-voltage circuit 6a of the bidirectional DC-DC converter 6 is a full-bridge circuit. However, the circuit configuration is not limited to the present embodiment, and the high-voltage circuit 6a may have another circuit configuration. In the present embodiment, the high-voltage circuit 6a is an example of a primary converter circuit, the low-voltage circuit 6b is an example of a secondary converter circuit, and the voltage of a direct current power at the I/O terminal of the primary converter circuit may be raised and the resultant power is then output from the I/O terminal of the secondary converter circuit. In some other embodiments, the voltage of DC power at the I/O terminal of the primary converter circuit may be lowered, and the resultant power may then be output from the I/O terminal of the secondary converter circuit.

REFERENCE SIGNS LIST 1 photovoltaic system
2 solar module
5 storage battery
6 bidirectional DC-DC converter
6a high-voltage circuit
6b low-voltage circuit
7 controller
20, 50 I/O terminal
31 to 34 switching element
31a to 34a backward diode
40 transformer
41 primary winding
42, 43 secondary winding
58 snubber capacitor
61 to 64 switching element
61a to 64a backward diode

The invention claimed is:

1. A bidirectional DC-DC converter, comprising:
a primary converter circuit that converts power between direct current power flowing through a first input-output terminal of the bidirectional DC-DC converter and alternating current power flowing through a primary winding of a high-frequency transformer; and
a secondary converter circuit that converts power between alternating current power flowing through a secondary winding of the high-frequency transformer and direct current power flowing through a second input-output terminal of the bidirectional DC-DC converter and convert alternating current power output from the primary converter circuit to direct current power, wherein
the secondary converter circuit comprises a first group of switching elements each comprising a backward diode and being connected to a secondary coil of the high-frequency transformer,
the primary converter circuit and the secondary converter circuit allow bidirectional conversion of power between the primary and secondary converter circuits,
the secondary converter circuit further comprises an active snubber circuit comprising a second group of switching elements each comprising a backward diode and being connected in parallel and a snubber capacitor connected in series to the second group of switching elements,
the snubber capacitor in the active snubber circuit comprises a first end connected to the second group of switching elements and a second end opposite to the first end and connected to a center tap of the high-frequency transformer.

2. The bidirectional DC-DC converter according to claim 1, wherein
the secondary converter circuit further comprises:
a smoothing capacitor connected between a positive terminal and a negative terminal at an input-output terminal of the secondary converter circuit, and
a smoothing reactor as an energy storage element, the smoothing reactor having a first end connected to the positive terminal and to the smoothing capacitor, wherein
the secondary winding of the high-frequency transformer comprises a first secondary winding and a second secondary winding, a first end of the first secondary winding and a first end of the second secondary winding are connected to each other to form a center tap, and the center tap is connected to a second end of the smoothing reactor opposite to the first end,
the first group of switching elements comprises a first switching element and a second switching element,
the second group of switching elements comprises a third switching element and a fourth switching element,
the first switching element comprises a drain connected to a source of the third switching element and to a second end of the first secondary winding opposite to the center tap,
the second switching element comprises a drain connected to a source of the fourth switching element and a second end of the second secondary winding opposite to the center tap, the first switching element and the second switching element comprise sources connected to the negative terminal and to the smoothing capacitor, and the first end of the snubber capacitor is connected to drains of the third switching element and the fourth switching element, and the second end of the snubber capacitor opposite to the first end is connected to the center tap of the high-frequency transformer and to the second end of the smoothing reactor.

3. A power conditioner, comprising:

the bidirectional DC-DC converter according to claim 2;

a DC-DC converter that raises an output voltage from a direct current power source or a solar module, and input the voltage to the bidirectional DC-DC converter; and a bidirectional DC-AC converter that converts direct current outputs from the bidirectional DC-DC converter and the DC-DC converter to alternating currents and transfer or receive alternating current power to or from a utility grid or a load.

4. The power conditioner according to claim 3, further comprising:

a controller that controls an on or off operation of the switching elements in the bidirectional DC-DC converter to control an amount of direct current power that is input to or output from the first input-output terminal and the second input-output terminal of the bidirectional DC-DC converter.

5. A distributed power system, comprising:

the power conditioner according to claim 4;

a power generator that outputs power to the DC-DC converter; and a storage battery configured to store power and to be charged with power or to discharge power through the bidirectional DC-DC converter in accordance with a difference between an amount of power from the power generator and an amount of electric load.

6. A distributed power system, comprising:

the power conditioner according to claim 3;

a power generator that outputs power to the DC-DC converter; and a storage battery configured to store power and to be charged with power or to discharge power through the bidirectional DC-DC converter in accordance with a difference between an amount of power from the power generator and an amount of electric load.

7. A power conditioner, comprising:

the bidirectional DC-DC converter according to claim 1;

a DC-DC converter that raises an output voltage from a direct current power source or a solar module, and input the voltage to the bidirectional DC-DC converter; and a bidirectional DC-AC converter that converts direct current outputs from the bidirectional DC-DC converter and the DC-DC converter to alternating currents and transfer or receive alternating current power to or from a utility grid or a load.

8. The power conditioner according to claim 7, further comprising:

a controller that controls an on or off operation of the switching elements in the bidirectional DC-DC converter to control an amount of direct current power that is input to or output from the first input-output terminal and the second input-output terminal of the bidirectional DC-DC converter.

9. A distributed power system, comprising:

the power conditioner according to claim 8;

a power generator that outputs power to the DC-DC converter; and a storage battery configured to store power and to be charged with power or to discharge power through the bidirectional DC-DC converter in accordance with a difference between an amount of power from the power generator and an amount of electric load.

10. A distributed power system, comprising:

the power conditioner according to claim 7;

a power generator that outputs power to the DC-DC converter; and a storage battery configured to store power and to be charged with power or to discharge power through the bidirectional DC-DC converter in accordance with a difference between an amount of power from the power generator and an amount of electric load.

* * * * *